(12) United States Patent
Minato et al.

(10) Patent No.: US 11,366,133 B2
(45) Date of Patent: Jun. 21, 2022

(54) SAMPLE PLATE AND AUTO-SAMPLER

(71) Applicant: Shimadzu Corporation, Kyoto (JP)

(72) Inventors: Hiroyuki Minato, Kyoto (JP); Takashi Inoue, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 143 days.

(21) Appl. No.: 16/649,099

(22) PCT Filed: Jun. 20, 2018

(86) PCT No.: PCT/JP2018/023451
§ 371 (c)(1),
(2) Date: Mar. 19, 2020

(87) PCT Pub. No.: WO2019/082436
PCT Pub. Date: May 2, 2019

(65) Prior Publication Data
US 2020/0241030 A1  Jul. 30, 2020

(30) Foreign Application Priority Data
Oct. 23, 2017 (JP) .............................. JP2017-204139

(51) Int. Cl.
*G01N 35/10* (2006.01)
*B01L 3/00* (2006.01)
*G01N 30/24* (2006.01)
*G01N 35/02* (2006.01)

(52) U.S. Cl.
CPC ...... *G01N 35/1011* (2013.01); *B01L 3/50853* (2013.01); *B01L 2300/044* (2013.01); *B01L 2300/0829* (2013.01); *B01L 2300/123* (2013.01); *G01N 2035/1027* (2013.01)

(58) Field of Classification Search
None
See application file for complete search history.

(56) References Cited

U.S. PATENT DOCUMENTS 4,988,618 A * 1/1991 Li ........................... B03C 1/288
                                                          435/6.13
5,641,681 A * 6/1997 Carter ...................... C30B 7/14
                                                          117/201

(Continued)

OTHER PUBLICATIONS

International Search Report for PCT application PCT/JP2018/023451 dated Sep. 18, 2018, submitted with a machine translation.

*Primary Examiner* — Matthew D Krcha
*Assistant Examiner* — Brittany I Fisher
(74) *Attorney, Agent, or Firm* — Muir Patent Law, PLLC

(57) ABSTRACT

The sample plate has a principal plane in which a plurality of wells is arranged. The sample plate has a plurality of through-holes each allowing a sampling needle to pass through in a region of the principal plane where the wells are not provided, and positions of the wells and positions of the through-holes are designed such that when two pieces of the sample plates are arranged up and down with a predetermined positional relationship in a state in which respective principal planes are arranged in parallel each other, the through-holes of the sample plate arranged on an upper side is arranged at positions directly above respective wells of the sample plate arranged on a lower side.

12 Claims, 11 Drawing Sheets

(56) References Cited

U.S. PATENT DOCUMENTS

| | | | | |
|---|---|---|---|---|
| 6,019,225 A | * | 2/2000 | Kalmakis | B01L 9/543 |
| | | | | 206/563 |
| 6,419,827 B1 | * | 7/2002 | Sandell | B01D 61/18 |
| | | | | 210/321.75 |
| 8,906,327 B2 | * | 12/2014 | Williams | B01L 9/543 |
| | | | | 422/564 |
| 2010/0190170 A1 | * | 7/2010 | Yu | B01L 3/50853 |
| | | | | 435/6.13 |

* cited by examiner

SAMPLE PLATE AND AUTO-SAMPLER

TECHNICAL FIELD

The present invention relates to a sample plate in which a plurality of wells each for accommodating a container containing a sample or a sample itself is provided on a principal plane, and also relates to an auto-sampler configured to allow an access to a desired well of the sample plate using a sampling needle.

BACKGROUND OF THE INVENTION

As an auto-sampler of a liquid chromatograph, there is an auto-sampler provided with a sample rack for installing a sample plate having a plurality of wells each for accommodating a container containing a sample or a sample itself. In such an auto-sampler, a plurality of sample plates is generally installed in the same plane so as not to overlap each other (see Patent Document 1).

On the other hand, there are some auto-samplers in which a plurality of sample plates is arranged in the up-down direction in multiple stages. In such an auto-sampler, since a sampling needle cannot access sample plates other than a sample plate installed in the uppermost stage in a state in which sample plates are arranged so as to overlap with each other, the auto-sampler is configured so that each sample plate can be moved to a position where the sampling needle can access each sample plate as required.

PRIOR ART DOCUMENT

Patent Document

Patent Document 1: Japanese Unexamined Patent Application Publication No. 2016-176749

SUMMARY OF THE INVENTION

Problems to be Solved by the Invention

In a system in which a plurality of sample plates is installed in the same plane, the installation area of the auto-sampler becomes large. On the other hand, in a system in which a plurality of sample plates is arranged in the up-down direction in multiple stages, the mechanism for moving the respective sample plates is required, which increases cost.

The present invention has been made in view of the above-mentioned problems, and an object thereof is to increase the number of installable sample plates in an auto-sampler without increasing cost.

Means for Solving the Problem

A sample plate according to the present invention has a principal plane in which a plurality of wells is arranged. The sample plate has a plurality of through-holes each allowing a sampling needle to pass through in a region of the principal plane where the wells are not provided. Positions of the wells and positions of the through-holes are designed so that when two pieces of the sample plates are arranged up and down with a predetermined positional relationship in a state in which respective principal planes are arranged in parallel each other, the plurality of through-holes of the sample plate arranged on an upper side is arranged at positions directly above respective wells of the lower sample plate.

That is, in the sample plate according to the present invention, even if two pieces of the sample plates are arranged up and down, a sampling needle can access the wells of the lower sample plate through the through-holes provided in the sample plate arranged on an upper side.

The sample plate according to the present invention is preferably provided on a lower surface side thereof with a protrusion configured to be inserted into the through-hole of the other sample plate arranged on a lower side of the sample plate when the sample plate is arranged on the upper side of the other sample plate. With this configuration, the positional relationship of both the sample plates can be fixed by inserting the protrusion provided on the lower surface side of the sample plate into the through-hole of the sample plate arranged on the lower side thereof.

On the upper surface of the sample plate, a sheet for sealing the upper surface of the well to prevent the liquid from evaporating may sometimes be arranged. Such a sheet is made of an elastic material such as silicone and can be penetrated by a sampling needle. When such a sheet is arranged on the upper surface of the sample plate, it is conceivable that the protrusion provided on the lower surface side of the sample plate is less likely to be inserted into the through-hole of the sample plate arranged on the lower side thereof. Therefore, the protrusion preferably has a shape with a pointed lower end. When the tip end of the protrusion is sharp, the tip end of the protrusion can penetrate the sheet covering the upper surface of the lower sample plate.

Further, the sample plate of the present invention is preferably provided with a downwardly protruding ridge portion on the lower surface side, and when the sample plate is arranged on a lower side of the other sample plate with a predetermined positional relationship in a state of being stacked up and down, a groove configured to fit the ridge portion of the other sample plate arranged on an upper side of the sample plate may be provided on an upper surface side of the sample plate. With this, it is easy to arrange two pieces of sample plates in a state of being stacked up and down with a predetermined positional relationship.

In cases where the upper surface of the sample plate is covered with a sheet made of an elastic material to seal the openings of the wells, the groove may be provided on an upper surface of the sheet. With this, even in cases where the upper surface of the sample plate is covered with a sheet, it is easy to arrange two pieces of the sample plates in a state of being stacked up and down with a predetermined positional relationship.

A plurality of through-holes each allowing the sampling needle to pass through may be provided in the sheet at positions corresponding to the plurality of through-holes of the sample plate.

The auto-sampler according to the present invention is provided with a sample plate installation member, a sampling needle, and a needle control unit. The sample plate installation member is a sample plate installation member for installing the above-mentioned sample plate, and is configured to allow a plurality of the sample plates to be arranged up and down in two stages with a predetermined positional relationship such that the plurality of through-holes of the sample plate arranged on the upper side is arranged at positions directly above respective wells of the sample plate arranged on a lower side. The sampling needle is for sucking liquid from the well of the sample plate or discharging the liquid to the well, and has mobility. The mobile means that it can be moved in the horizontal direction or vertical direction by a drive mechanism. The needle controller is configured to drive the sampling needle such that, when sucking or discharging the liquid from or to a target well which is the well of the lower sampling plate of two pieces of the sample plates installed on the sample plate installation member up and down with the predetermined positional relationship, the sampling needle is lowered from a position directly above the through-hole of the sample plate arranged on an upper side directly above the target well to pass through the through-hole so that a tip end of the sampling needle reaches the target well.

That is, the auto-sampler according to the present invention is configured such that the above-mentioned sample plates can be installed up and down in two stages, namely, the sampling needle can access either the upper sample plate or the lower sample plate installed in two stages.

In the auto-sampler of the present invention, the sample plate installation member may be provided with an upper sample rack and a lower sample rack for mounting the upper sample plate and the lower sample plate independently of each other, respectively. In this instance, the upper sample rack is provided with through-holes each allowing the sampling needle to pass through at positions corresponding to the through-holes of the upper sample plate installed on the upper sample rack.

Effects of the Invention

In the sample plate according to the present invention, since the sampling needle can access the well of the lower sample plate through the through-hole provided in the upper sample plate even if two pieces of the sample plates are arranged up and down, a plurality of sample plates can be arranged so as to be stacked up and down without providing a mechanism for moving the sample plates. With this, the installable number of the sample plates can be increased while suppressing the expansion of the installation area of the auto-sampler.

The auto-sampler according to the present invention is configured such that the above-mentioned sample plates can be installed up and down in two stages, and the sampling needle can access both the upper sample plate and the lower sample plate installed in two stages. Therefore, the number of installable sample plates can be increased while suppressing the expansion of the installation area of the auto-sampler without providing a mechanism for moving the sample plates.

EMBODIMENTS FOR CARRYING OUT THE INVENTION

Hereinafter, preferred embodiments of a sample plate and an auto-sampler according to the present invention will be described with reference to the attached drawings.

Figure 1:
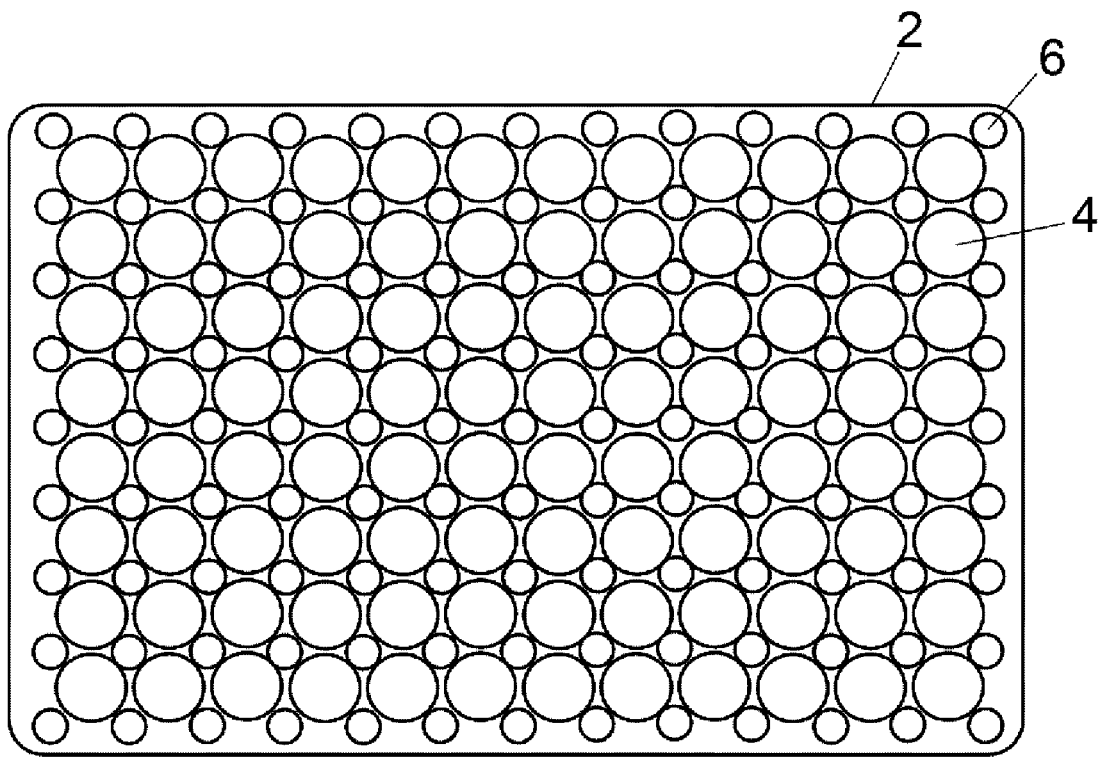
FIG. 1 is a plan view showing an example of a sample plate.

As shown in FIG. 1, in the sample plate 2 of this example, a plurality of wells 4 each for accommodating a sample is arranged in matrix within a principal plane. The sample plate 2 is provided with a plurality of through-holes 6 in a region of the principal plane where the wells 4 are not provided. The through-hole 6 is for allowing the sampling needle 24 of an auto-sampler 20 (see FIG. 11) to be described later to pass through.

Figure 2:
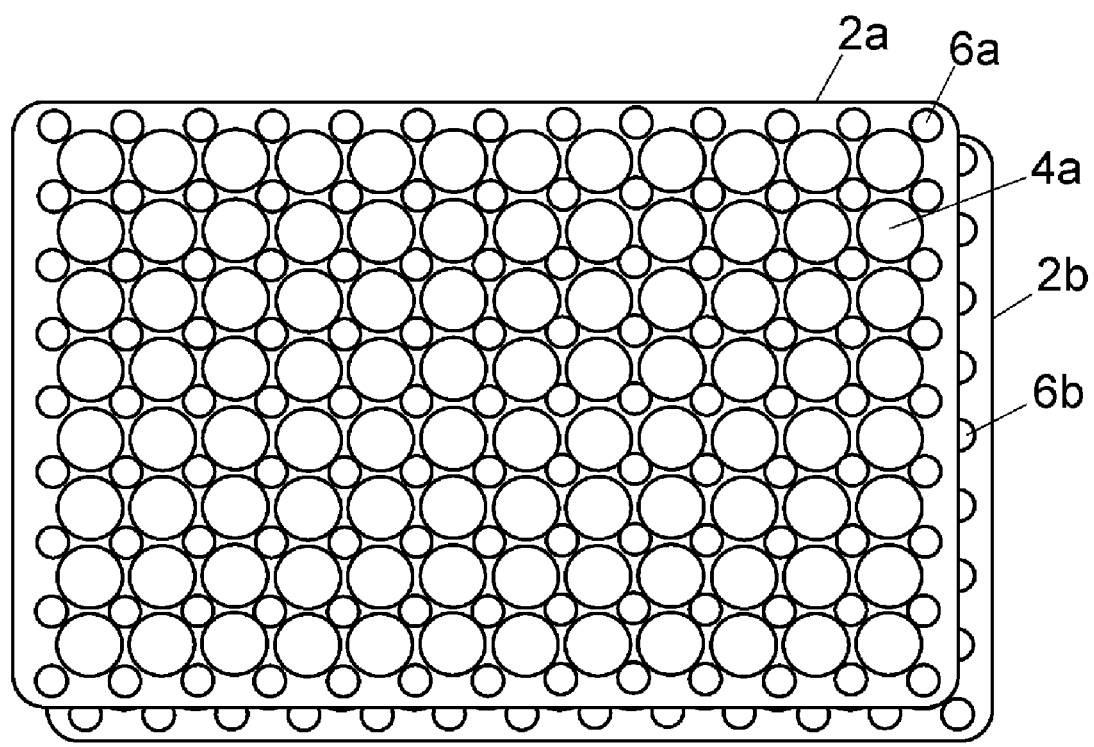
FIG. 2 is a plan view showing the state in which the sample plates of the example are arranged up and down with a predetermined positional relationship.

As shown in FIG. 2, the sample plate 2 is configured to be used in an auto-sampler 20 (see FIG. 11) in a state in which two pieces of the sample plates 2 are arranged in a state of being stacked up and down. Hereinafter, of the sample plates 2 arranged up and down as shown in FIG. 2, the sample plate arranged on the upper side will be referred to as an upper sample plate 2a, and the sample plate arranged on the lower side will be referred to as a lower sample plate 2b.

Figure 3:
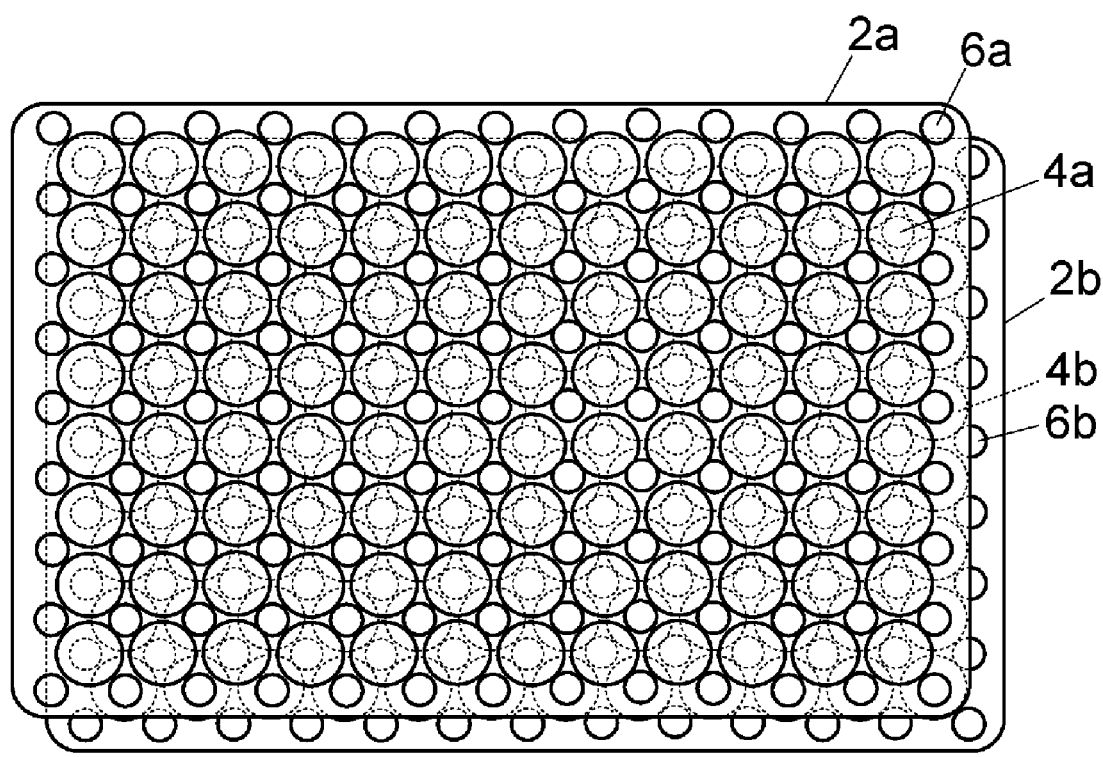
FIG. 3 is a plan view for explaining the positional relationship between wells and through-holes of the sample plates arranged up and down with a predetermined positional relationship.

As shown in FIG. 3, the wells 4 and the through-holes 6 of the sample plate 2 are provided at positions where the through-holes 6a of the upper sample plate 2a are arranged at positions directly above the wells 4b of the lower sample plate 2b when the upper sample plate 2a and the lower sample plate 2b are displaced from each other by a predetermined distance in the horizontal direction and become a predetermined positional relationship. With this, by lowering the sampling needle 24 of the auto-sampler 20 (see FIG. 11) from above the upper sample plate 2a to pass through the through-hole 6a, it is possible to make the sampling needle 24 access the well 4b of the lower sample plate 2b.

When arranging the sample plates 2 up and down, the upper sample plate 2a and the lower sample plate 2b may be stacked one on the other or may be spaced apart from each other. In the case of stacking the upper sample plate 2a and the lower sample plate 2b, both the sample plates 2a and 2b are preferably positioned with a predetermined positional relationship.

Figure 4:
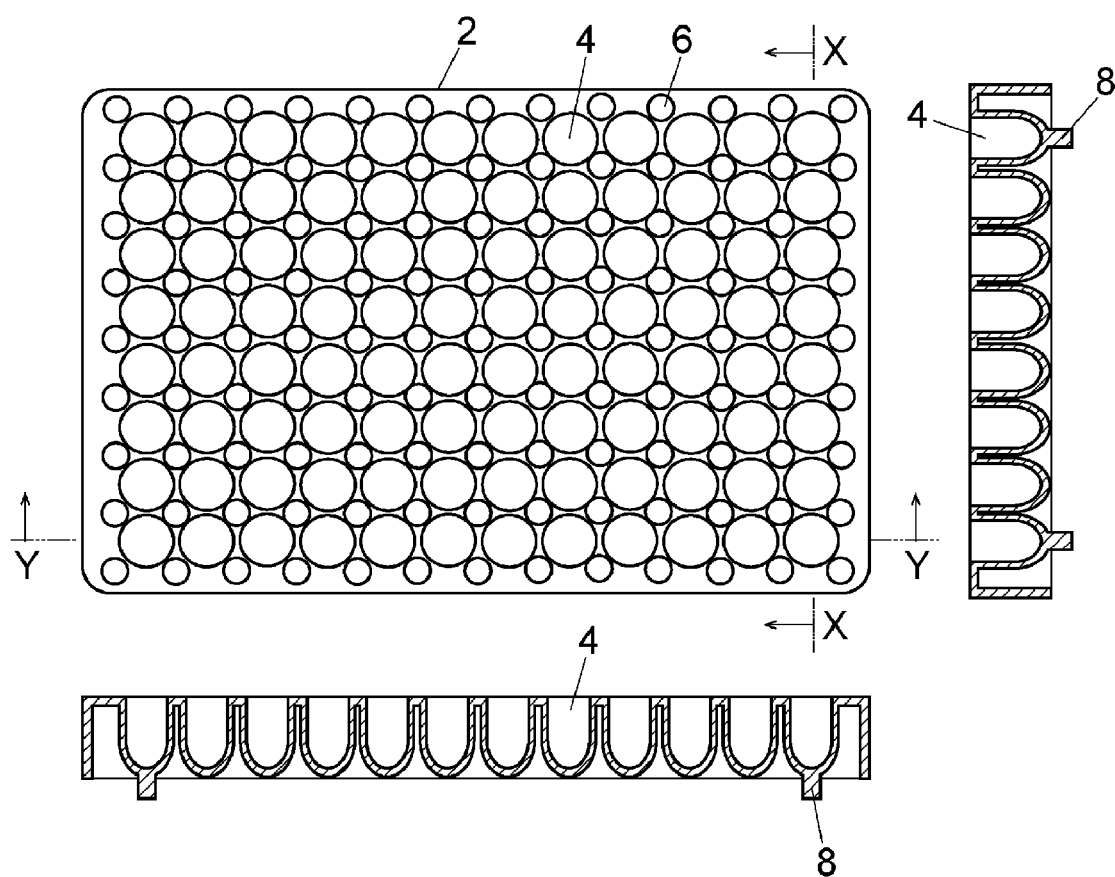
FIG. 4 is a plan view and cross-sectional views showing an example of the sample plate in which protrusions are provided on a lower surface side.
Figure 5:
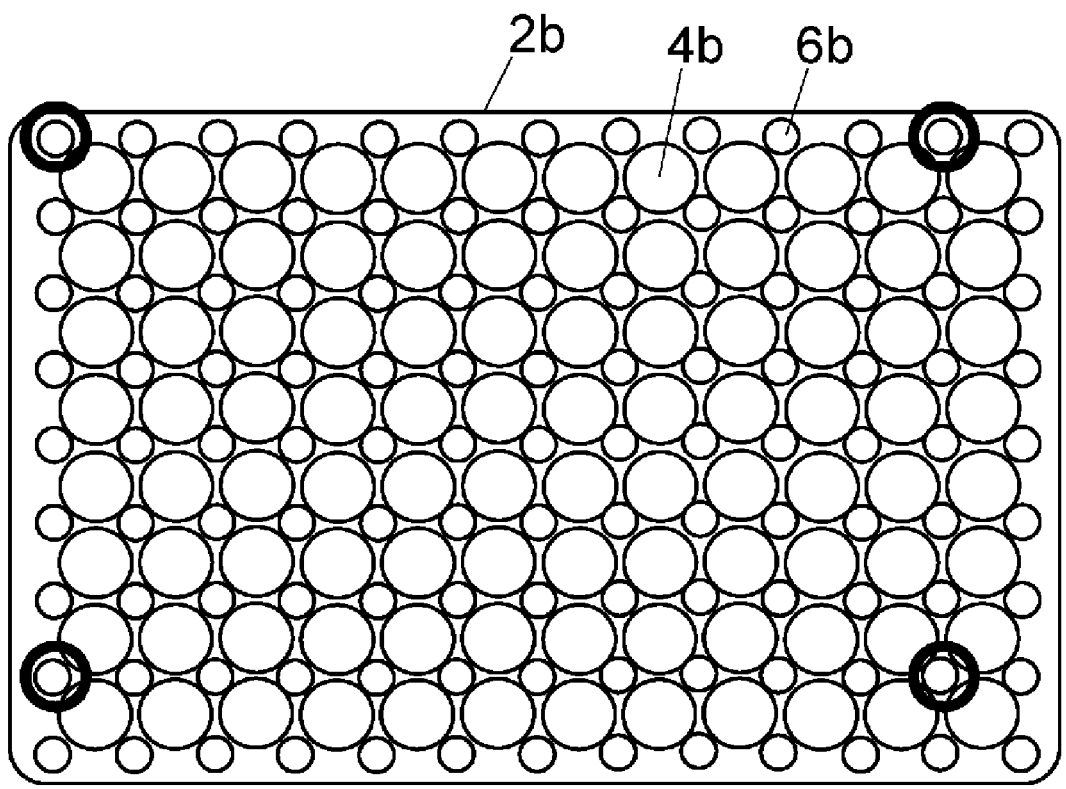
FIG. 5 is a plan view for explaining positions of through-holes into which protrusions provided on the lower surface of the sample plate are inserted.

FIG. 4 shows an example of a structure for positioning the upper sample plate 2a and the lower sample plate 2b with each other. In the example of FIG. 4, a protrusion 8 extending downward is provided on the lower surface of each well 4 at the four corners of the sample plate 2. The protrusion 8 has an outer diameter substantially the same as the inner diameter of the through-hole 6. The protrusion 8 is a part to be inserted into the through-hole 6b of the lower sample plate 2b arranged below. In this embodiment, the upper sample plate 2a and the lower sample plate 2b are positioned with a predetermined positional relationship by inserting the protrusions 8 of the upper sample plate 2a into the through-holes 6b of the lower sample plate 2b surrounded by the thick line in FIG. 5. Note that the protrusion 8 is not always required to be provided at the bottom of the well 4 at the four corners and may be provided at any positions as long as it performs the same function.

Figure 6:
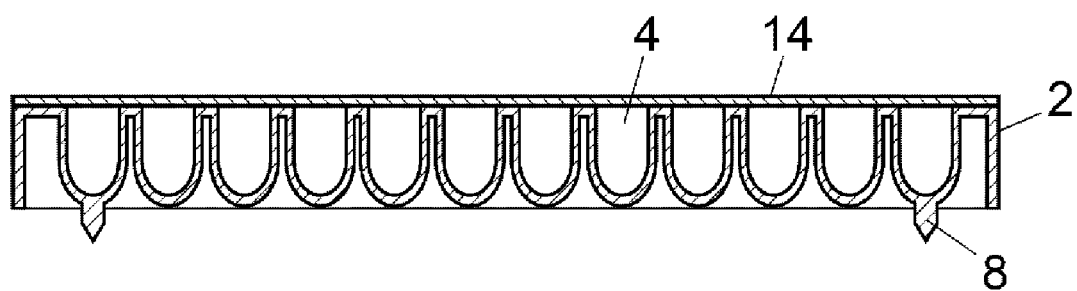
FIG. 6 is a cross-sectional view showing a modification of the shape of the lower surface side protrusion of the sample plate.

As shown in FIG. 6, note that a sheet 14 for preventing evaporation of the liquid in the wells 4 is sometimes provided on the upper surface of the sample plate 2. The sheet 14 is made of a resilient material such as silicone that can be penetrated by a sampling needle 24 (see FIG. 11). In cases where such a sheet 14 covers the upper surface of the sample plate 2, the upper surface of the through-hole 6 is covered with the sheet 14, which makes it difficult to insert the protrusion 8 of the upper sample plate 2a into the through-hole 6b of the lower sample plate 2b. Therefore, by making the tip end of the protrusion 8 in a sharp shape as shown in FIG. 6, the sheet 14 can be pierced by the tip end of the protrusion 8, and therefore the protrusion 8 of the upper sample plate 2a can be easily inserted into the through-hole 6b of the lower sample plate 2b.

Figure 7:
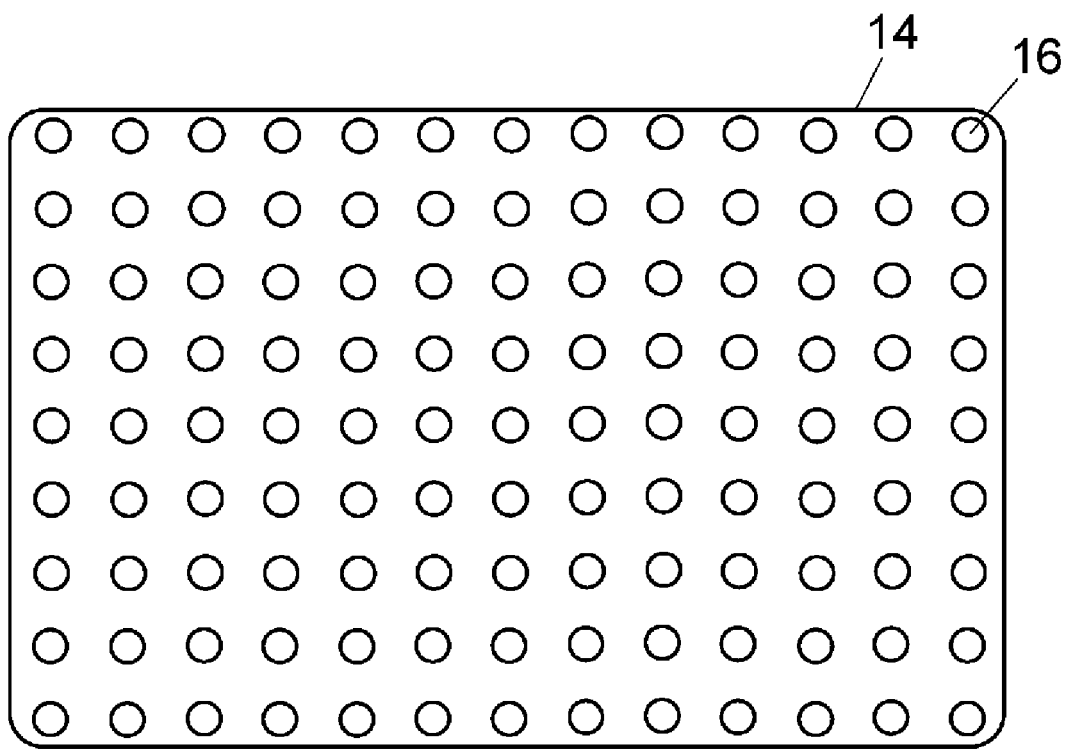
FIG. 7 is a plan view showing an example of a sheet covering the upper surface of the sample plate.

As shown in FIG. 7, a through-hole 16 corresponding to the through-hole 6 of the sample plate 2 may be provided in the principal plane of the sheet 14 covering the upper surface of the sample plate 2. This eliminates the need for the sampling needle 24 to penetrate the sheet 14 when the sampling needle 24 of the auto-sampler 20 (see FIG. 11) attempts to penetrate the through-hole 6a of the upper sample plate 2a, facilitating the passage of the through-hole 6a by the sampling needle 24.

Figure 8:
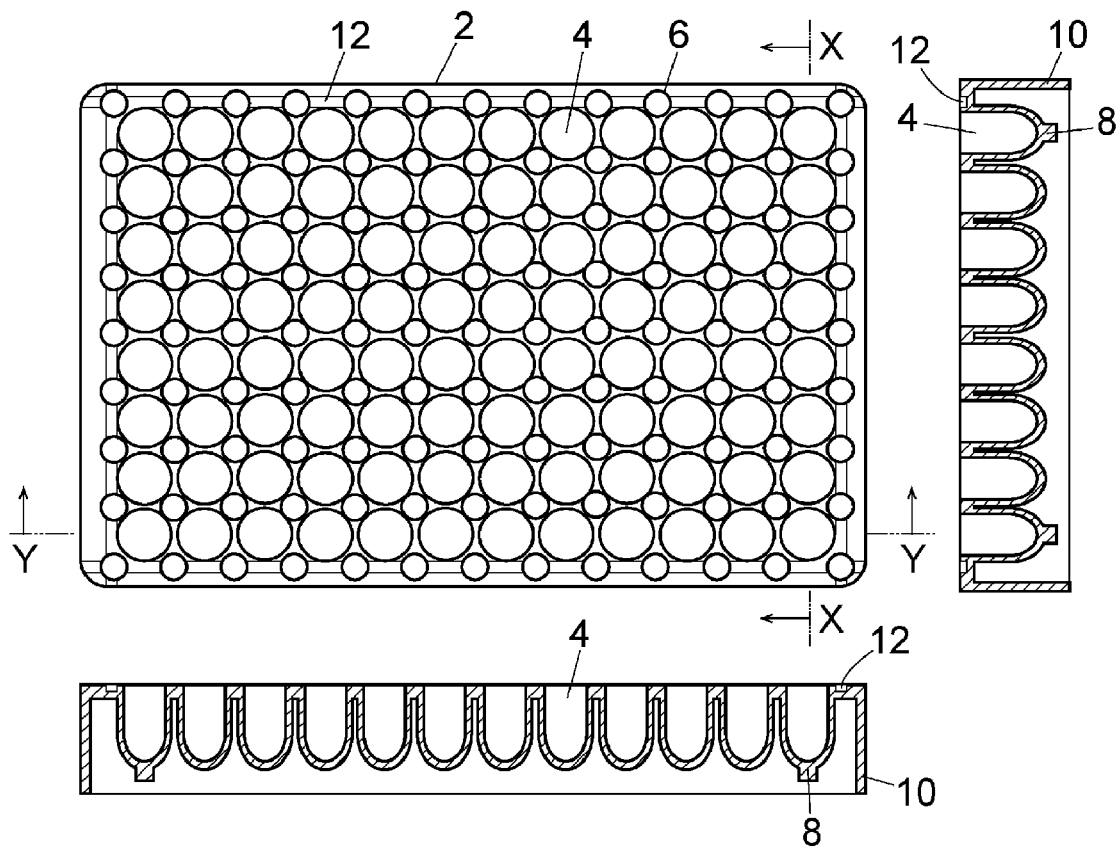
FIG. 8 is a plan view and cross-sectional views showing an example of a sample plate having a ridge portion on the lower surface side and a groove on the upper surface.
Figure 9:
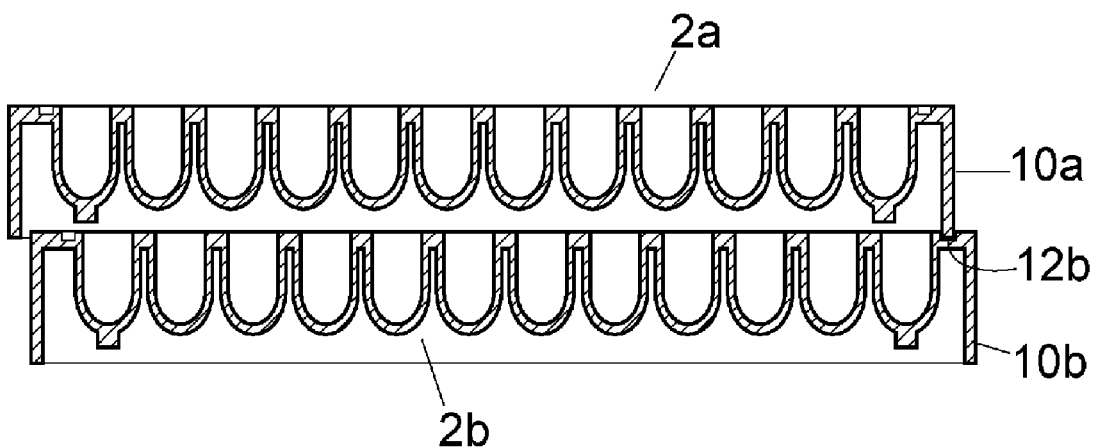
FIG. 9 is a cross-sectional view showing a state in which the sample plates of the example are arranged up and down with a predetermined positional relationship.
Figure 10:
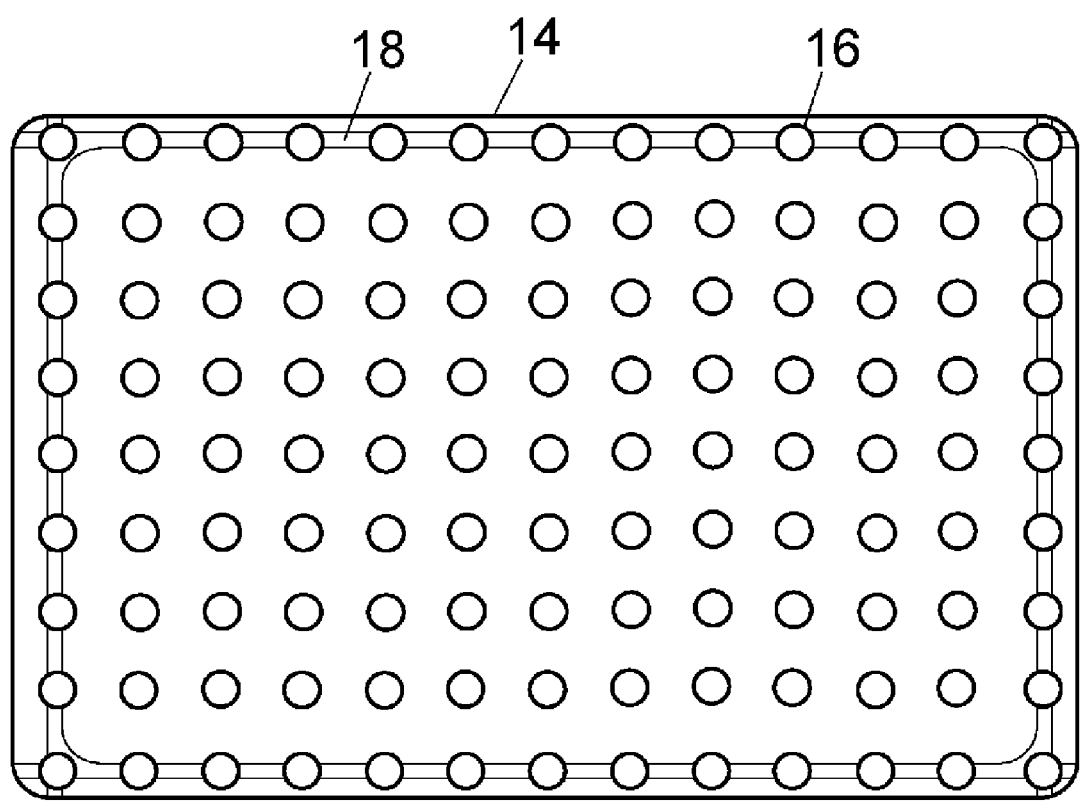
FIG. 10 is a plan view showing an example of a sheet having a groove on the upper surface.

As shown in FIG. 8, a ridge portion 10 may be provided on the lower surface side of the sample plate 2, and a groove 12 may be provided on the upper surface of the sample plate 2 to fit the ridge portion 10. The ridge portion 10 and the groove 12 are designed such that the ridge portion 10 of the upper sample plate 2a fits into the groove 12 of the lower sample plate 2b so that the upper sample plate 2a and the lower sample plate 2b can be positioned with a predetermined positional relationship. In the example of FIG. 8, the peripheral edge portion of the sample plate 2 extends downward to form the ridge portion 10, and the upper surface of the sample plate 2 is provided with the groove 12 having a shape corresponding to the shape of the ridge portion 10.

In cases where the upper surface of the sample plate 2 is covered with a sheet 14, by providing a groove 18 for fitting the ridge portion 10 of the sample plate 2 on the upper surface of the sheet 14, the same positioning function as providing the groove 12 on the upper surface of the sample plate 2 can be exerted.

Figure 11:
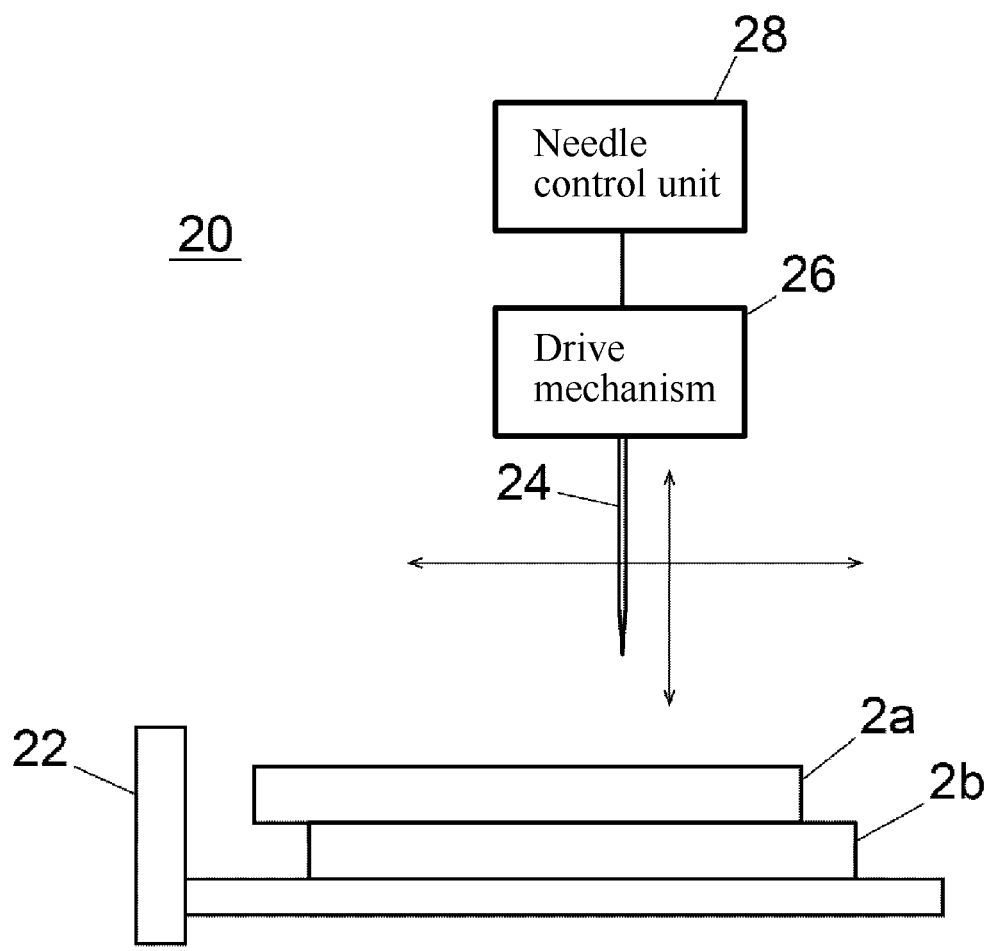
FIG. 11 is a schematic configuration diagram showing an example of an auto-sampler.

An example of an auto-sampler using the above-described sample plates 2 will be described with reference to FIG. 11.

The auto-sampler 20 of this example is provided with a sample rack 22 (sample plate installation member) for installing a plurality of sample plates 2 (the upper sample plate 2a and the lower sample plate 2b) in a state in which they are arranged up and down with a predetermined positional relationship, a sampling needle 24 held in a state in which the tip end faces vertically downward above the sample rack 22, a drive mechanism 26 for driving the sampling needle 24 in the horizontal direction and the vertical direction, and a needle controller 28 for controlling the operation of the drive mechanism 26. Although a pair of the upper sample plate 2a and the lower sample plate 2b is shown in FIG. 11, the sample plate installation member 22 may be configured such that a plurality of pairs of the upper sample plate 2a and the lower sample plate 2b can be installed.

The needle controller 28 is realized by a dedicated computer or a general-purpose computer and functions obtained by executing a predetermined program by arithmetic elements provided in the computer. The needle controller 28 has information about the position of each well 4a of the upper sample plate 2a and information about the position of each well 4b of the lower sample plate 2b, and is configured to control the operation of the drive mechanism 26 based on the information to cause the sampling needle 24 to access the position of a desired well 4a or 4b.

For example, in cases where the sampling needle 24 sucks the sample from the well 4b of the lower sample plate 2b, the sampling needle 24 is lowered from a position directly above the target well 4b. Since the through-hole 6a of the upper sample plate 2a is provided directly above each well 4b of the lower sample plate 2b, when the sampling needle 24 is lowered from a position directly above the target well 4b, the sampling needle 24 can pass through the through-hole 6a of the upper sample plate 2a and the tip end of the sampling needle 24 can reach the target well 4b.

Figure 12:
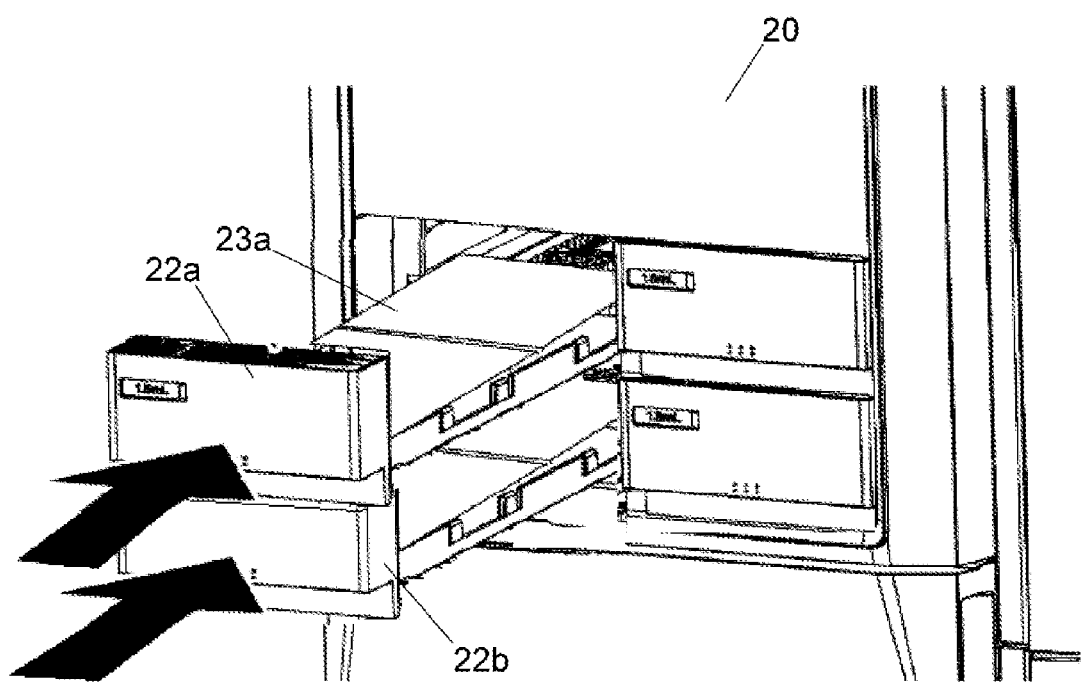
FIG. 12 is a perspective view showing an example of an auto-sampler having a two-stage sample rack.

As shown in FIG. 12, the auto-sampler 20 may be provided, as a sample plate installation member, with an upper sample rack 22a for mounting the upper sample plate 2a and a lower sample rack 22b for mounting the lower sample plate 2b. In this case, the upper sample rack 22a and the lower sample rack 22b are configured such that, when stored at a predetermined position in the auto-sampler 20, the sample plates 2a and the 2b placed on the respective racks 22a and 22b are arranged up and down with a predetermined positional relationship.

As described above, in cases where the upper sample plate 2a and the lower sample plate 2b are mounted on the separate sample racks 22a, 22b, the upper sample rack 22a needs to be structured so that the sampling needle 24 that has passed through the through-hole 6a of the upper sample plate 2a can reach the lower sample plate 2b.

Figure 13:
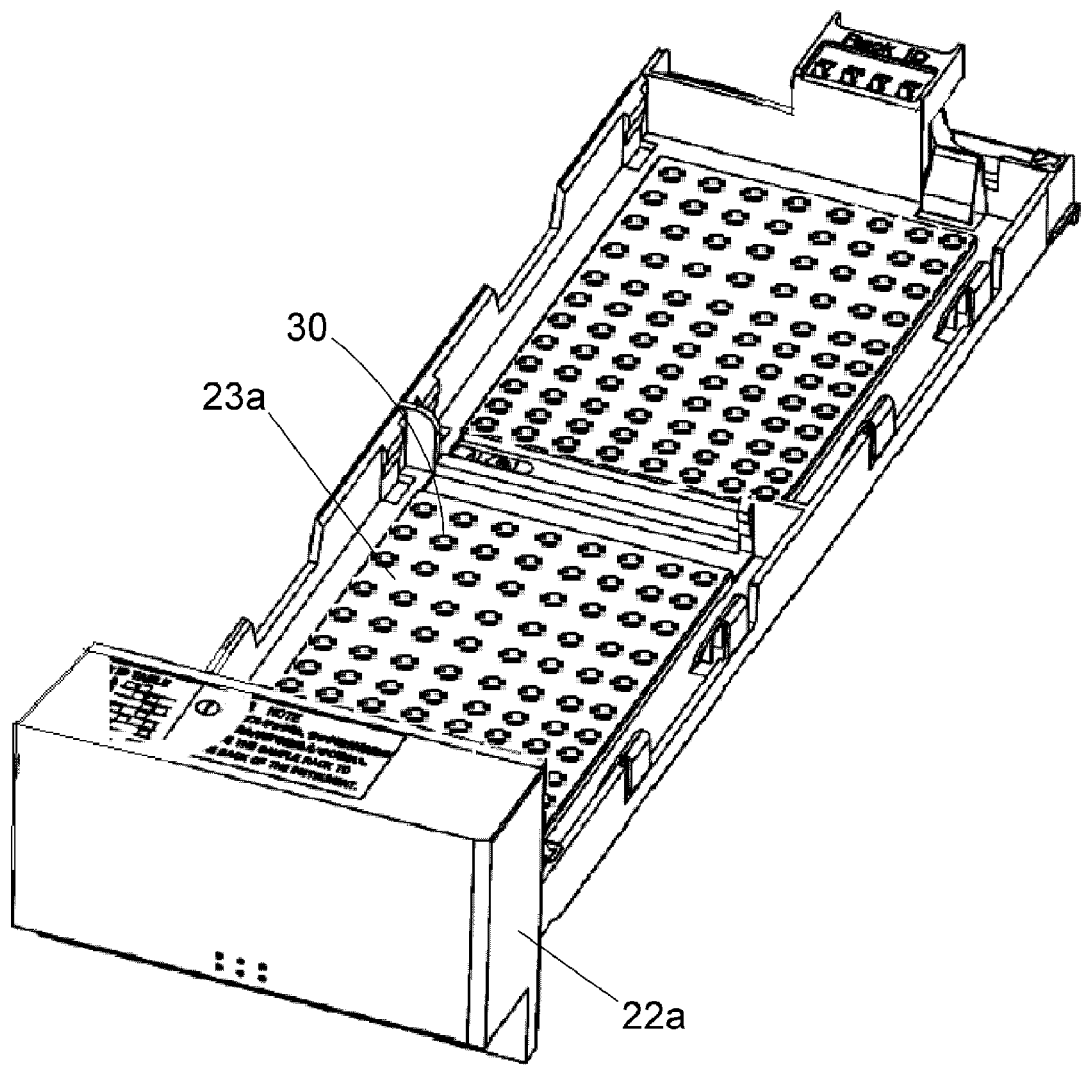
FIG. 13 is a perspective view showing the structure of the sample rack of the example.

FIG. 13 shows the example in which a through-hole 30 corresponding to the through-hole 6a of the upper sample plate 2a is provided in the base plate 23a of the upper sample rack 22a positioned below the upper sample plate 2a. The structure of the upper sample rack 22a is not limited to this, and any structure may be used as long as the structure does not hinder the lowering and rising of the sampling needle 24 that passes through the through-hole 6a of the upper sample plate 2a.

DESCRIPTION OF SYMBOLS

2 :sample plate
2a :upper sample plate
2b :lower sample plate
4, 4a, 4b :well
6, 6a, 6b :through-hole (sample plate)
8 :protrusion
10 :ridge portion
12 :groove (sample plate upper surface)
14 :sheet
16 :through-hole (sheet)
18 :groove (sheet)
20 :auto-sampler
22, 22a, 22b :sample rack (sample plate installation member)
24 :sampling needle
26 :drive mechanism 28 :needle control unit
30 :through-hole (sample rack)

The invention claimed is:

1. A sample plate comprising:
a plurality of wells being arranged in a principal plane;
a plurality of through-holes configured to each allow a sampling needle to pass through, and provided in regions of the principal plane where the plurality of wells is not provided; and
a protrusion provided on a lower surface side of the sample plate and configured to be inserted into a through-hole of a second sample plate arranged on a lower side of the sample plate in a state in which the sample plate is arranged on an upper side of the second sample plate, the protrusion having an outer diameter substantially the same as an inner diameter of the through-hole,
wherein positions of the plurality of wells and positions of the plurality of through-holes are designed such that in a state in which two pieces of the sample plate and a second sample plate are arranged up and down with a predetermined positional relationship, the principal plane of the sample plate and a principal plane of the second sample plate being arranged in parallel each other, the plurality of through-holes of the sample plate arranged on the upper side is arranged at positions directly above respective wells of the second sample plate arranged on the lower side.

2. The sample plate as recited in claim 1,
wherein the protrusion has a shape with a pointed lower end.

3. The sample plate as recited in claim 1, further comprising:
a downwardly protruding ridge portion provided on the lower surface side; and
a groove provided on the upper side and configured to fit a ridge portion of the second sample plate arranged on an upper side of the sample plate in a state in which the sample plate is arranged on a lower side of the second sample plate, the sample plate and the second sample plate being stacked up and down with a predetermined positional relationship.

4. The sample plate as recited in claim 3,
wherein an upper surface of the sample plate is covered with a sheet made of an elastic material to seal openings of the wells, and
wherein the groove is provided on an upper surface of the sheet.

5. The sample plate as recited to claim 1,
wherein an upper surface of the sample plate is covered with a sheet made of an elastic material to seal openings of the wells, and
wherein the plurality of through-holes each allowing the sampling needle to pass through is provided in the sheet at positions corresponding to the plurality of through-holes of the sample plate.

6. An auto-sampler comprising:
a sample plate installation member where the sample plate as recited in claim 1 is installed, the sample plate installation member being configured to allow a plurality of the sample plates to be arranged up and down in two stages with a predetermined positional relationship such that the through-holes of the sample plate arranged on an upper side is arranged at positions directly above respective wells of the sample plate arranged on a lower side;
a movable sampling needle configured to suck or discharge liquid from or to the well of the sample plate; and
a needle controller configured to drive the sampling needle such that when sucking or discharging the liquid from or to a target well which is the well of the sample plate arranged on the lower side of two pieces of the sample plates installed on the sample plate installation member up and down with the predetermined positional relationship, the sampling needle is lowered from a position directly above the through-hole of the sample plate arranged on the upper side directly above the target well to pass through the through-hole so that a tip end of the sampling needle reaches the target well.

7. The auto-sampler as recited in claim 6,
wherein the sample plate installation member includes an upper sample rack and a lower sample rack where the sample plate arranged on the upper side and the sample plate arranged on the lower side are installed independently of each other, respectively, and
wherein the upper sample rack is provided with a through-hole allowing the sampling needle to pass through at a position corresponding to the through-hole of the sample plate arranged on the upper side and installed on the upper sample rack.

8. The sample plate as recited in claim 1,
wherein the protrusion is provided on a lower surface side of the well.

9. A sample plate comprising:
a plurality of wells being arranged in a principal plane;
a plurality of through-holes configured to each allow a sampling needle to pass through, and provided in regions of the principal plane where the plurality of wells is not provided;
a protrusion provided on a lower surface side and configured to be inserted into a through-hole of a second sample plate arranged on the lower side of the sample plate in a state in which the sample plate is arranged on an upper side of the second sample plate;
a downwardly protruding ridge portion provided on a surface of the lower side; and
a groove provided on an upper surface side and configured to fit a ridge portion of the second sample plate arranged on an upper side of the sample plate in a state in which the sample plate is arranged on a lower side of the second sample plate, the sample plate and the second sample plate being stacked up and down with a predetermined positional relationship,
wherein positions of the plurality of wells and positions of the plurality of through-holes are designed such that in a state in which two pieces of the sample plate and a second sample plate are arranged up and down with a predetermined positional relationship, the principal plane of the sample plate and a principal plane of the second sample plate being arranged in parallel each other, the plurality of through-holes of the sample plate arranged on an upper side is arranged at positions directly above respective wells of the second sample plate arranged on a lower side.

10. The sample plate as recited in claim 9,
wherein the protrusion has a shape with a pointed lower end.

11. The sample plate as recited in claim 9,
wherein an upper surface of the sample plate is covered with a sheet made of an elastic material to seal openings of the wells, and wherein the groove is provided on an upper surface of the sheet.

12. The sample plate as recited to claim 9,
wherein an upper surface of the sample plate is covered with a sheet made of an elastic material to seal openings of the wells, and
wherein the plurality of through-holes each allowing the sampling needle to pass through is provided in the sheet at positions corresponding to the plurality of through-holes of the sample plate.

\* \* \* \* \*